(12) United States Patent
Tyson

(10) Patent No.: US 9,228,028 B2
(45) Date of Patent: Jan. 5, 2016

(54) CONTINUOUS PROCESS FOR PREPARING POLYFLUOROACRYLATE PARTICLES

(75) Inventor: George Tyson, Los Altos Hills, CA (US)

(73) Assignee: Relypsa, Inc., Redwood City, CA (US)

( * ) Notice: Subject to any disclaimer, the term of this patent is extended or adjusted under 35 U.S.C. 154(b) by 0 days.

(21) Appl. No.: 13/636,162

(22) PCT Filed: Mar. 18, 2011

(86) PCT No.: PCT/US2011/028950
§ 371 (c)(1),
(2), (4) Date: Jan. 9, 2013

(87) PCT Pub. No.: WO2011/119422
PCT Pub. Date: Sep. 29, 2011

(65) Prior Publication Data
US 2013/0197170 A1  Aug. 1, 2013

Related U.S. Application Data

(60) Provisional application No. 61/315,937, filed on Mar. 20, 2010.

(51) Int. Cl.
*C08F 2/18* (2006.01)
*C08F 2/01* (2006.01)
*C08F 2/00* (2006.01)
*C08F 220/24* (2006.01)
*C08F 212/36* (2006.01)
*C08F 236/22* (2006.01)

(52) U.S. Cl.
CPC ... *C08F 2/01* (2013.01); *C08F 2/00* (2013.01); *C08F 220/24* (2013.01); *C08F 212/36* (2013.01); *C08F 236/22* (2013.01)

(58) Field of Classification Search
USPC .............................................. 526/88, 65, 245
See application file for complete search history.

(56) References Cited

U.S. PATENT DOCUMENTS

| | | |
|---|---|---|
| 2,694,700 A | 11/1954 | Shanta |
| 3,069,366 A | 12/1962 | Schwarz et al. |
| 4,444,961 A | 4/1984 | Timm |
| 4,487,898 A * | 12/1984 | Kato et al. ...................... 526/65 |
| 6,602,965 B1 | 8/2003 | Terazawa et al. |
| 8,337,824 B2 * | 12/2012 | Albrecht et al. ............. 424/78.1 |
| 2001/0053814 A1 | 12/2001 | Yamamoto et al. |
| 2010/0111891 A1 * | 5/2010 | Albrecht et al. ............. 424/78.1 |
| 2010/0261020 A1 * | 10/2010 | Fukuda et al. ................ 428/421 |
| 2011/0040049 A1 | 2/2011 | Saita et al. |

FOREIGN PATENT DOCUMENTS

| | | |
|---|---|---|
| EP | 1 411 076 A1 | 4/2004 |
| GB | 1 436 167 | 5/1976 |
| JP | 06-032805 A | 2/1994 |
| JP | 2004-250627 A | 9/2004 |
| JP | 2009-062478 A | 3/2009 |

(Continued)

*Primary Examiner* — Peter D. Mulcahy
*Assistant Examiner* — Henry Hu
(74) *Attorney, Agent, or Firm* — Senniger Powers LLP

(57) ABSTRACT

The present invention is directed to processes for making a crosslinked cation exchange polymer comprising a fluoro group and an acid group. The process allows the polymer to be efficiently made on a commercial scale, and the polymers are useful to bind potassium in the gastrointestinal tract of a human or animal subject.

17 Claims, 1 Drawing Sheet

(56) References Cited

FOREIGN PATENT DOCUMENTS

| WO | 2010/022380 A2 | 2/2010 |
| WO | 2010/022381 A1 | 2/2010 |
| WO | 2010/022382 A2 | 2/2010 |
| WO | 2010/022383 A2 | 2/2010 |
| WO | WO-2010/022380 A2 * | 2/2010 |
| WO | WO-2010/022381 A1 * | 2/2010 |
| WO | WO-2010/022382 A2 * | 2/2010 |
| WO | WO-2010/022383 A2 * | 2/2010 |

* cited by examiner

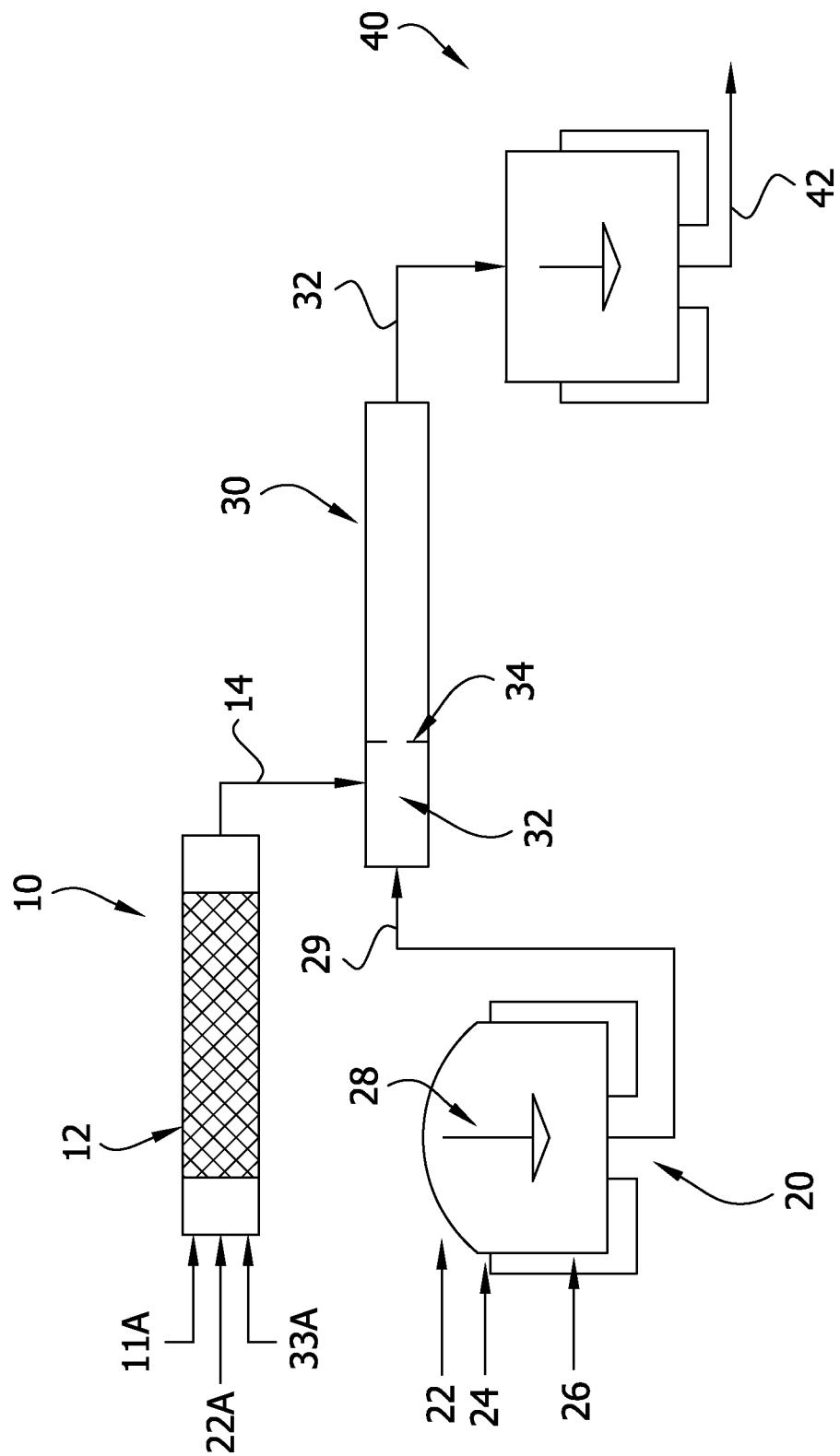

CONTINUOUS PROCESS FOR PREPARING POLYFLUOROACRYLATE PARTICLES

FIELD OF THE INVENTION

The present invention is directed to processes for making a crosslinked polymer comprising a fluoro group and an acid group. The process allows the polymer to be made on a commercial scale, and the polymers are useful to bind potassium in the gastrointestinal tract.

BACKGROUND OF THE INVENTION

Potassium ($K^+$) is one of the most abundant intracellular cations. Potassium homeostasis is maintained predominantly through the regulation of renal excretion. Various medical conditions, such as decreased renal function, genitourinary disease, cancer, severe diabetes mellitus, congestive heart failure and/or the treatment of these conditions can lead to or predispose patients to hyperkalemia. Hyperkalemia can be treated with various cation exchange polymers including polyfluoroacrylic acid (polyFAA) as disclosed in WO 2005/097081, WO2010/022381, WO2010/022382, and WO2010/022383, each of which is incorporated herein in their entirety by reference.

In the previous methods of manufacturing, batch or semi-continuous processes were used. However, such processes are not suited to commercial production of this polymer due to increased costs, and it was accordingly an object of the present invention to find a process for the preparation of cross-linked (2-fluoroacrylate)-divinylbenzene-1,7-octadiene polymer particles, which is suitable for a production process on the industrial scale. The aim was in particular industrial processes for the preparation of crude particles (crosslinkage), their washing, drying, preparation of salts, and the consistent coordination of these processes with one another in order finally to arrive at a preparation process which is as simple and efficient as possible guaranteeing the quality requirements (formation of by-products which is as low as possible) and high yield.

SUMMARY OF THE INVENTION

The present invention provides a continuous process for making a crosslinked polymer.

The crosslinked polymer comprises structural units corresponding to Formulae 1 and 2, Formulae 1 and 3, or Formulae 1, 2, and 3, wherein Formula 1, Formula 2, and Formula 3 are represented by the following structures:

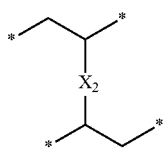

Formula 1

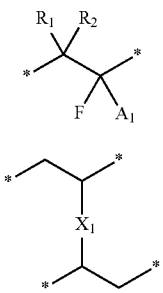

Formula 2

Formula 3 wherein $R_1$ and $R_2$ are each independently hydrogen, alkyl, cycloalkyl, or aryl; $A_1$ is carboxylic, phosphonic, or phosphoric; $X_1$ is arylene; and $X_2$ is alkylene, an ether moiety, or an amide moiety. In some instances, Formula 1, Formula 2, and Formula 3 are represented by the following structures:

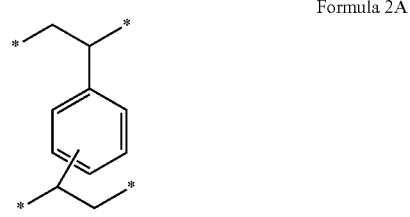

Formula 1A

Formula 2A

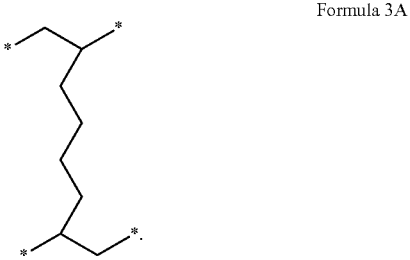

Formula 3A

Another aspect is a crosslinked polymer comprises structural units corresponding to Formulae 1 and 2, Formulae 1 and 3, or Formulae 1, 2, and 3. In some instances, the structural units of Formula 1, Formula 2 and Formula 3 correspond to Formula 1A, Formula 2A, and Formula 3A, respectively.

In some instances, Formula 11, Formula 22, and Formula 33 are represented by the following structures:

Formula 11A

Formula 22A

Formula 33A

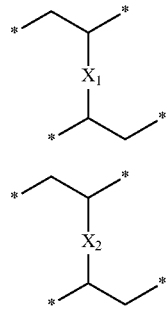

Formula 2

Formula 3

The process generally utilizes a continuous reactor, preferably a jacketed plug flow reactor with an upfront orifice, all of which are sized to produce a particle having the desired physical properties.

BRIEF DESCRIPTION OF THE DRAWINGS

FIG. 1 is a schematic of the process of the present invention.

DETAILED DESCRIPTION

The present invention is a continuous process to prepare a crosslinked polymer. A batch suspension polymerization, as disclosed in WO2010/022380, which is incorporated herein by reference for all purposes. A batch process, for example, produces product that meets specification, but the process is time-consuming, contains large quantities of reactive materials, and may lead to batch variability. A continuous reactor and process has several important potential advantages, including (1) a continuous reactor and process can operate at high volumetric efficiency, taking up less space and requiring less capital expense than a batch reactor; (2) the high surface area of coolant to reactants in a continuous reactor and process allows better temperature control, giving better reaction conversions while minimizing the amount of reactive components at any given time or place, which is a safety improvement; (3) the feed of raw materials as well as the temperature control can be optimized to minimize variability in the product over time, leading to more uniform production of product; and (4) the high degree of automation of continuous equipment may lead to reduced labor costs. These benefits of the continuous process can be utilized by those of skill in the art to create a variety of reactor designs, including for example, a plug flow reactor or a continuous stirred tank reactor. Either of these reactors can be utilized in a continuous process for the production of the desired cross-linked polymer.

The crosslinked polymer comprises structural units corresponding to Formulae 1 and 2, Formulae 1 and 3, or Formulae 1, 2, and 3, wherein Formula 1, Formula 2, and Formula 3 are represented by the following structures:

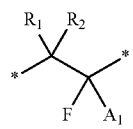

Formula 1 wherein $R_1$ and $R_2$ are each independently hydrogen, alkyl, cycloalkyl, or aryl; $A_1$ is carboxylic, phosphonic, or phosphoric; $X_1$ is arylene; and $X_2$ is alkylene, an ether moiety, or an amide moiety. More specifically, $R_1$ and $R_2$ are each independently hydrogen, alkyl, cycloalkyl, or aryl; $A_1$ is carboxylic, phosphonic, or phosphoric; $X_1$ is arylene; and $X_2$ is alkylene, an ether moiety, or an amide moiety.

When $X_2$ is an ether moiety, the ether moiety can be $-(CH_2)_d-O-(CH_2)_e-$ or $-(CH_2)_d-O-(CH_2)_e-O-(CH_2)_d-$, wherein d and e are independently an integer of 1 through 5. In some instances, d is an integer from 1 to 2 and e is an integer from 1 to 3. When $X_2$ is an amide moiety, the amide moiety can be $-C(O)-NH-(CH_2)_p-NH-C(O)-$ wherein p is an integer of 1 through 8. In some instances, p is an integer of 4 to 6.

The unit corresponding to Formula 2 can be derived from a difunctional crosslinking monomer having the formula $CH_2=CH-X_1-CH=CH_2$ wherein $X_1$ is as defined in connection with Formula 2. Further, the unit corresponding to Formula 3 can be derived from a difunctional crosslinking monomer having the formula $CH_2=CH-X_2-CH=CH_2$ wherein $X_2$ is as defined in connection with Formula 3.

In connection with Formula 1, in one embodiment, $R_1$ and $R_2$ are hydrogen and $A_1$ is carboxylic. In connection with Formula 2, in one embodiment, $X_1$ is an optionally substituted phenylene, and preferably phenylene. In connection with Formula 3, in one embodiment, $X_2$ is optionally substituted ethylene, propylene, butylene, pentylene, or hexylene; more specifically, $X_2$ is ethylene, propylene, butylene, pentylene, or hexylene; and preferably $X_2$ is butylene. In one specific embodiment, $R_1$ and $R_2$ are hydrogen, $A_1$ is carboxylic, $X_1$ is phenylene and $X_2$ is butylene.

In one embodiment, the crosslinked polymer comprises at least about 80 wt. %, particularly at least about 85 wt. %, and more particularly at least about 90 wt. % or from about 80 wt. % to about 95 wt. % or from about 85 wt. % to about 95 wt. % of structural units corresponding to Formula 1 based on the total weight of the structural units as used in the polymerization reaction corresponding to (i) Formulae 1 and 2, (ii) Formulae 1 and 3, or (iii) Formulae 1, 2, and 3. Additionally, the polymer can comprise a unit of Formula 1 having a mole fraction of at least about 0.87 or from about 0.87 to about 0.94 or from about 0.90 to about 0.92 based on the total number of moles of the units corresponding to (i) Formulae 1 and 2, (ii) Formulae 1 and 3, or (iii) Formulae 1, 2, and 3.

In one embodiment, the polymer contains structural units of Formulae 1, 2, and 3 and has a weight ratio of the structural unit corresponding to Formula 2 to the structural unit corresponding to Formula 3 of from about 4:1 to about 1:4, from about 2:1 to 1:2, or about 1:1. Additionally, this polymer can have a mole ratio of the structural unit of Formula 2 to the structural unit of Formula 3 of from about 0.2:1 to about 7:1;

from about 0.2:1 to about 3.5:1; from about 0.5:1 to about 1.3:1, from about 0.8 to about 0.9; or 0.85:1.

Generally, the Formulae 1, 2 and 3 structural units of the terpolymer have specific ratios, for example, wherein the structural units corresponding to Formula 1 constitute at least about 85 wt. % or from about 80 to about 95 wt. %, from about 85 wt. % to about 93 wt. %, or from about 88 wt. % to about 92 wt. % based on the total weight of structural units of Formulae 1, 2, and 3 in the polymer, calculated based on the amounts of monomers of Formulae 11, 22, and 33 used in the polymerization reaction, and the weight ratio of the structural unit corresponding to Formula 2 to the structural unit corresponding to Formula 3 is from about 4:1 to about 1:4, or about 1:1. Further, the ratio of structural units when expressed as the mole fraction of the structural unit of Formula 1 in the polymer is at least about 0.87 or from about 0.87 to about 0.94, or from about 0.9 to about 0.92, based on the total number of moles of the structural units of Formulae 1, 2, and 3, and the mole ratio of the structural unit of Formula 2 to the structural unit of Formula 3 is from about 0.2:1 to about 7:1, from about 0.2:1 to about 3.5:1; or from about 0.8 to about 0.9; or 0.85:1; again these calculations are performed using the amounts of monomers of Formulae 11, 22, and 33 used in the polymerization reaction. It is not necessary to calculate conversion.

In some aspects, the crosslinked polymer comprises units corresponding to (i) Formulae 1A and 2A, (ii) Formulae 1A and 3A, or (iii) Formulae 1A, 2A, and 3A, wherein Formulae 1A, 2A and 3A are generally represented by the following structures.

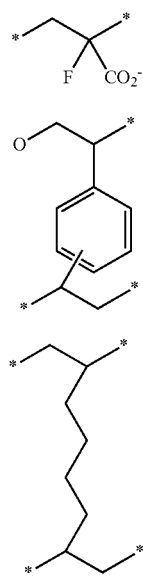

Formula 1A

Formula 2A

Formula 3A

The structural units of the terpolymer can have specific ratios, for example, wherein the structural units corresponding to Formula 1A constitute at least about 85 wt. % or from about 80 to about 95 wt. %, from about 85 wt. % to about 93 wt. %, or from about 88 wt. % to about 92 wt. % based on the total weight of structural units of Formulae 1A, 2A, and 3A, calculated based on the amounts of monomers of Formulae 11A, 22A, and 33A used in the polymerization reaction, and the weight ratio of the structural unit corresponding to Formula 2A to the structural unit corresponding to Formula 3A is from about 4:1 to about 1:4, or about 1:1. Further, the ratio of structural units when expressed as the mole fraction of the structural unit of Formula 1A in the polymer is at least about 0.87 or from about 0.87 to about 0.94, or from about 0.9 to about 0.92 based on the total number of moles of the structural units of Formulae 1A, 2A, and 3A calculated from the amount of monomers of Formulae 11A, 22A, and 33A used in the polymerization reaction, and the mole ratio of the structural unit of Formula 2A to the structural unit of Formula 3A is from about 0.2:1 to about 7:1, from about 0.2:1 to about 3.5:1, from about 0.5:1 to about 1.3:1, from about 0.8:1 to about 0.9:1, or about 0.85:1.

The polymers described herein are generally random polymers wherein the exact order of the structural units of Formulae 1, 2, or 3 (derived from monomers of Formulae 11, 22, or 33), or 1A, 2A, or 3A (derived from monomers of Formulae 11A, 22A, or 33A) is not predetermined.

A polymer derived from monomers of Formulae 11, 22, and 33, followed by hydrolysis, can have a structure represented as follows:

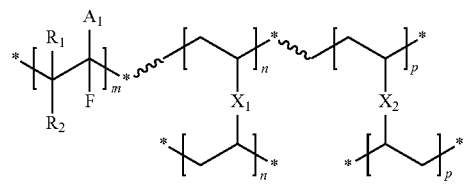

Formula 40 wherein $R_1$, $R_2$, $A_1$, $X_1$, and $X_2$ are as defined in connection with Formulae 1, 2, and 3 and m is in the range of from about 85 to about 93 mol %, n is in the range of from about 1 to about 10 mol % and p is in the range of from about 1 to about 10 mol %, calculated based on the ratios of monomers added to the polymerization mixture. The wavy bonds in the polymer structures of Formula 40 are included to represent the random attachment of structural units to one another wherein the structural unit of Formula 1 can be attached to another structural unit of Formula 1, a structural unit of Formula 2, or a structural unit of Formula 3; the structural units of Formulae 2 and 3 have the same range of attachment possibilities.

Using the polymerization process described herein, with monomers generally represented by Formulae 11A, 22A and 33A leads to a polymer represented by the general structure shown below:

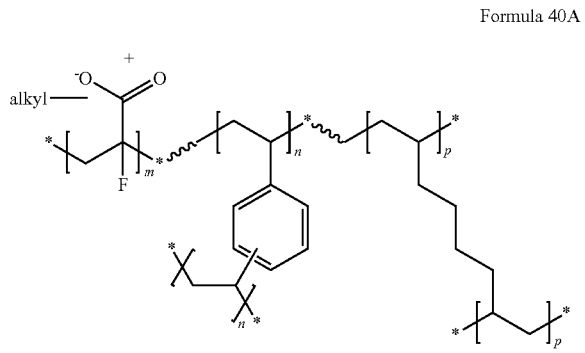

Formula 40A wherein m is in the range of from about 85 to about 93 mol %, n is in the range of from about 1 to about 10 mol % and p is in the range of from about 1 to about 10 mol %, calculated based on the ratios of monomers added to the polymerization mixture. The wavy bonds in the polymer structures of Formula 40A are included to represent the random attachment of structural units to one another wherein the structural unit of Formula 1A can be attached to another structural unit of Formula 1A, a structural unit of Formula 2A, or a structural unit of Formula 3A; the structural units of Formulae 2A and 3A have the same range of attachment possibilities.

The crosslinked polymer is generally the reaction product of a polymerization mixture that is subjected to polymerization conditions. The polymerization mixture may also contain components that are not chemically incorporated into the polymer. The crosslinked polymer typically comprises a fluoro group and a protected acid group that is the product of the polymerization of at least two, and optionally three, different monomer units where one monomer comprises a fluoro group and a protected acid group and the other monomer is a difunctional arylene monomer or a difunctional alkylene, ether- or amide-containing monomer, or a combination thereof. More specifically, the crosslinked polymer can be the reaction product of a polymerization mixture comprising monomers of (i) Formulae 11 and 22, (ii) Formulae 11 and 33, or (iii) Formulae 11, 22, and 33. The monomers of Formulae 11, 22, and 33 are generally represented by

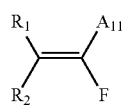

Formula 11

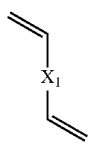

Formula 22

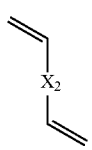

Formula 33 wherein $R_1$ and $R_2$ are as defined in connection with Formula 1, $X_1$ is as defined in connection with Formula 2, $X_2$ is as defined in connection with Formula 3, and $A_{11}$ is an optionally protected carboxylic, phosphonic, or phosphoric. In a preferred embodiment, $A_{11}$ is a protected carboxylic, phosphonic, or phosphoric. The product of a polymerization reaction comprising monomers of (i) Formulae 11 and 22, (ii) Formulae 11 and 33, or (iii) Formulae 11, 22, and 33 comprises a polymer having optionally protected acid groups and comprising units corresponding to Formula 10 and units corresponding to Formulae 2 and 3. Polymer products having protected acid groups can be hydrolyzed to form a polymer having unprotected acid groups and comprising units corresponding to Formulae 1, 2, and 3. The structural units generally represented by Formula 10 have the structure

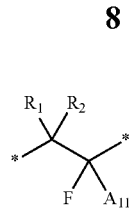

Formula 10 wherein $R_1$, $R_2$, and $A_{11}$ are as defined in connection with Formula 11.

In preferred embodiments of any of the methods of the invention wherein the crosslinked polymer is a reaction product of a polymerization mixture of monomers, $A_{11}$ is a protected carboxylic, phosphonic, or phosphoric. The polymer formed in the polymerization reaction contains protected carboxylic, phosphonic, or phosphoric groups.

In one embodiment, the reaction mixture comprises at least about 85 wt. % or from about 80 wt. % to about 95 wt. % of monomers corresponding to Formula 11 based on the total weight of the monomers corresponding to (i) Formulae 11 and 22, (ii) Formulae 11 and 33, or (iii) Formulae 11, 22, and 33. Additionally, the reaction mixture can comprise a unit of Formula 11 having a mole fraction of at least about 0.87 or from about 0.87 to about 0.94 based on the total number of moles of the monomers corresponding to (i) Formulae 11 and 22, (ii) Formulae 11 and 33, or (iii) Formulae 11, 22, and 33.

In one embodiment, the polymerization reaction mixture contains monomers of Formulae 11, 22, and 33 and has a weight ratio of the monomer corresponding to Formula 22 to the monomer corresponding to Formula 33 from about 4:1 to about 1:4, from about 2:1 to 1:2, or about 1:1. Additionally, this mixture can have a mole ratio of the monomer of Formula 22 to the monomer of Formula 33 from about 0.2:1 to about 7:1, from 0.2:1 to 3.5:1, from about 0.5:1 to about 1.3:1, from about 0.8:1 to about 0.9:1, or about 0.85:1.

Particular crosslinked polymers are the reaction product of a polymerization mixture comprising monomers of (i) Formulae 11 and 22, (ii) Formulae 11 and 33, or (iii) Formulae 11, 22, and 33. The monomers are generally represented by Formulae 11A, 22A, and 33A having the structure:

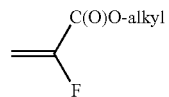

Formula 11A

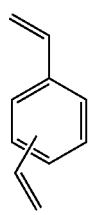

Formula 22A

-continued

Formula 33A wherein alkyl is preferably selected from methyl, ethyl, propyl, iso-propyl, butyl, iso-butyl, sec-butyl, tert-butyl, pentyl, iso-pentyl, sec-pentyl, or tert-pentyl. Most preferably, the alkyl group is methyl or tert-butyl. The —O-alkyl moiety protects the carboxyl moiety from reacting with other reactive moieties during the polymerization reaction and can be removed by hydrolysis as described in more detail below. The alkyl in Formula 11A is preferably methyl or ethyl.

Further, the polymerization reaction mixture contains at least about 85 wt. % or from about 80 wt. % to about 95 wt. % of monomers corresponding to Formula 11A based on the total weight of the monomers which are generally represented by (i) Formulae 11A and 22A, (ii) Formulae 11A and 33A, or (iii) Formulae 11A, 22A, and 33A. Additionally, the reaction mixture can comprise a unit of Formula 11A having a mole fraction of at least about 0.87 or from about 0.87 to about 0.94 or from about 0.9 to about 0.92 based on the total number of moles of the monomers present in the polymer which are generally represented by (i) Formulae 11A and 22A, (ii) Formulae 11A and 33A, or (iii) Formulae 11A, 22A, and 33A.

In some instances, the reaction mixture contains monomers of Formulae 11, 22, and 33 and the weight ratio of the monomer generally represented by Formula 22A to the monomer generally represented by Formula 33A of from about 4:1 to about 1:4 or about 1:1. Also, this mixture has a mole ratio of the monomer of Formula 22A to the monomer of Formula 33A of from about 0.2:1 to about 7:1, from about 0.2:1 to about 3.5:1, from about 0.5:1 to about 1.3:1, from about 0.8:1 to about 0.9:1, or about 0.85:1.

For those polymerization reactions that contain additional components in the polymerization mixture that are not intended to be incorporated into the polymer, such additional components typically comprise surfactants, solvents, salts, buffers, aqueous phase polymerization inhibitors and/or other components known to those of skill in the art. A polymerization initiator can used and be chosen from a variety of classes of initiators. For instance, initiators that generate polymer imitating radicals upon exposure to heat include peroxides, persulfates or azo type initiators (e.g., 2,2'-azobis(2-methylpropionitrile), laurylperoxide, tert-butyl hydro peroxide, dimethyl-2,2'-azobis(2-methylpropionate), 2,2'-azobis(2-methyl-N-(2-hydroxyethyl)propionamide), 2,2'-azobis(2-(2-imidazolin-2-yl)propane), (2,2"-azo bis(2,4-dimethylvaleronitrile), t-butyl-peroxy pivalatelauroyl peroxide (LPO), or a combination thereof. Another class of polymer initiating radicals is radicals generated from redox reactions, such as persulfates and amines. A surfactant may be selected from the group consisting of anionic, cationic, nonionic, amphoteric, zwitterionic, or a combination thereof. Anionic surfactants are typically based on sulfate, sulfonate or carboxylate anions. These surfactants include, sodium dodecyl sulfate (SDS), ammonium lauryl sulfate, other alkyl sulfate salts, sodium laureth sulfate (or sodium lauryl ether sulfate (SLES)), N-lauroylsarcosine sodium salt, lauryldimethylamine-oxide (LDAO), ethyltrimethylammoniumbromide (CTAB), bis(2-ethylhexyl)sulfosuccinate sodium salt, alkyl benzene sulfonate, soaps, fatty acid salts, or a combination thereof. Cationic surfactants, for example, contain quaternary ammonium cations. These surfactants are cetyl trimethylammonium bromide (CTAB or hexadecyl trimethyl ammonium bromide), cetylpyridinium chloride (CPC), polyethoxylated tallow amine (POEA), benzalkonium chloride (BAC), benzethonium chloride (BZT), or a combination thereof. Zwitterionic or amphoteric surfactants include dodecyl betaine, dodecyl dimethylamine oxide, cocamidopropyl betaine, coco ampho glycinate, or a combination thereof. Nonionic surfactants include alkyl poly(ethylene oxide), copolymers of poly (ethylene oxide) and poly(propylene oxide) (commercially called Poloxamers or Poloxamines), alkyl polyglucosides (including octyl glucoside, decyl maltoside, fatty alcohols, cetyl alcohol, oleyl alcohol, cocamide MEA, cocamide DEA), or a combination thereof.

Polymerization reaction stabilizers may be selected from the group consisting of organic polymers and inorganic particulate stabilizers. Examples include polyvinyl alcohol-co-vinylacetate and its range of hydrolyzed products, polyvinylacetate, polyvinylpyrolidinone, salts of polyacrylic acid, cellulose ethers, natural gums, or a combination thereof. Buffers may be selected from the group consisting of for example, 4-2-hydroxyethyl-1-piperazineethanesulfonic acid, 2-{[tris(hydroxymethyl)methyl]amino}ethanesulfonic acid, 3-(N-morpholino)propanesulfonic acid, piperazine-N,N'-bis (2-ethanesulfonic acid), or a combination thereof. Polymerization reaction salts may be selected from the group consisting of potassium chloride, calcium chloride, potassium bromide, sodium bromide, sodium bicarbonate, ammonium peroxodisulfate, or a combination thereof.

Generally, the continuous process is carried out in the manner shown in FIG. 1. As shown in FIG. 1, there is a mixer 10 that mixes the organic phase (e.g., monomers) prior to addition to the reactor 30. The mixer 10 may be of a design known to those of skill in the art, such as a static mixer that is preferred because it has no moving parts and is best for space considerations. There are a variety of inputs into the mixer 10, such as monomers 11A, 22A and 33A, which are as described above. Other inputs may include initiators 12, which are described above, and/or other organic elements as known in the art. There may be additional equipment between the mixer 10 and the reactor 30, such as pumps, filters, etc., which are not shown. In addition, the monomers 11A, 22A and 33A may be pumped into the mixer 10, but such pumps are not shown.

FIG. 1 also shows vessel 20, which is a vessel to mix aqueous feeds to the reactor 30. Vessel 20 has various feeds including numbers 22, 24 and 26 which include water, polymerization salts, surfactants, and stabilizers, all of which are listed above. In addition, an agitator 28 is shown in vessel 20 for good mixing prior to being introduced to reactor 30. There may be additional equipment between vessel 20 and reactor 30, such as pumps, filters, etc., which are not shown.

Reactor 30 is shown in FIG. 1 with feeds from mixer 10 and vessel 20. The feeds are introduced and mixed upstream 32 of orifice 34. In one embodiment, the reactor 30 is a plug flow reactor. Design elements relevant for the reactor 30 include the precise feeding of the aqueous phase 29 from vessel 20 and the organic phase 14 from mixer 10 in the correct ratios, which are detailed above. Various equipment can properly meter feeds 14, 29, including pumps, pressure control, etc. A plug flow reactor will include orifice 34, which is sized to disperse the organic phase into the aqueous phase such that the dispersed (or suspended) particles are in the proper size distribution (discussed below) for the polymer product. A plug flow reactor includes a pipe diameter that is in the correct range to lead to turbulence such that the suspended organics stay in suspension and do not coalesce before the polymerization is complete. Such pipe diameters can be calculated by those of skill in the art using known chemical engineering methods. A plug flow reactor may also include a jacket temperature controller (not shown) such that the reaction heat is controlled such that the suspension reaches the time/temperature profile to yield substantially complete reaction progression.

Specific examples of a reactor 30 include: a mini-plant reactor with a production of about 20 kg/hr of polymer, which is based on a ⅛" tube (schedule 80) with an orifice diameter of 4.09 mm to give an average particle of 100 microns. Another specific example is a full-scale reactor with a production of about 295 kg/hr of polymer (or 2.2 million kg/yr), which is based on a ¾" pipe (schedule 40) with an orifice diameter of 14.5 mm to give an average particle of 100 microns. A third example is an expanded full-scale reactor with a production of 477 kg/hr of polymer (or 3.55 million kg/yr), which is based on a 1" pipe (schedule 40) with an orifice diameter of 18.2 mm to give an average particle of 100 microns.

Orifice designs are known to those of skill in the art, including one or more holes comprising the total orifice size. Orifice holes may be shaped, such as tapered or flat, such as those of skill in the art will understand based on control of shear and droplet sizes. The reactor 30 can comprise one more pipes, including multiple pipes in a bundle. The reactor 30 can be designed to maintain a certain turbulence for particle formation and heat transfer. In one preferred embodiment, a plug flow reactor can comprise a bundle of tubes that form a single reactor enclosed within a shell.

FIG. 1 also shows an exit stream 32 from reactor 30 going to a stirred tank reactor 40. The exit stream 32 may be a slurry including the desired polymer, depending on the reactor chosen. The stirred tank reactor 40 may allow for completion of the reaction to prevent the polymer particles from agglomerating. The stirred tank reactor 40 may also allow for more continuous feed through exit 42 to additional downstream equipment (not shown); the downstream equipment may be batch or continuous processes.

The polymerization is carried out under polymerization conditions, including a temperature generally in the range from about 0° C. to about 100° C., more preferably in the range of about 50-70° C., with a post reaction temperature of up to 90° C. Reaction pressures are standard polymerization conditions known to those of skill in the art, and generally sufficient to ensure that the monomers stay in the liquid phase (e.g., greater than atmospheric pressure) given the reaction temperatures. The materials of construction of both the static mixer and the continuous reactor should be of materials impervious to corrosion by the process fluids.

The crosslinked polymers are in the form of substantially spherical particles. As used herein, the term "substantially" means generally rounded particles having an average aspect ratio of about 1.0 to about 2.0. Aspect ratio is the ratio of the largest linear dimension of a particle to the smallest linear dimension of the particle. Aspect ratios may be easily determined by those of ordinary skill in the art. This definition includes spherical particles, which by definition have an aspect ratio of 1.0. In some embodiments, the particles have an average aspect ratio of about 1.0, 1.2, 1.4, 1.6, 1.8 or 2.0. The particles may be round or elliptical when observed at a magnification wherein the field of view is at least twice the diameter of the particle.

The crosslinked polymer particles have a mean diameter of from about 20 µm to about 200 µm. Specific ranges are where the crosslinked particles have a mean diameter of from about 20 µm to about 200 µm, from about 20 µm to about 150 µm, or from about 20 µm to about 125 µm. Other ranges include from about 35 µm to about 150 µm, from about 35 µm to about 125 µm, or from about 50 µm to about 125 µm. Particle sizes, including mean diameters, distributions, etc. can be determined using techniques known to those of skill in the art. For example, U.S. Pharmacopeia (USP) <429> discloses methods for determining particle sizes.

Various crosslinked polymer particles also have less than about 4 volume percent of the particles that have a diameter of less than about 10 µm; particularly, less than about 2 volume percent of the particles that have a diameter of less than about 10 µm; more particularly, less than about 1 volume percent of the particles that have a diameter of less than about 10 µm; and even more particularly, less than about 0.5 volume percent of the particles that have a diameter of less than about 10 µm. In other cases, specific ranges are less than about 4 volume percent of the particles that have a diameter of less than about 20 µm; less than about 2 volume percent of the particles that have a diameter of less than about 20 µm; less than about 1 volume percent of the particles that have a diameter of less than about 20 µm; less than about 0.5 volume percent of the particles that have a diameter of less than about 20 µm; less than about 2 volume percent of the particles that have a diameter of less than about 30 µm; less than about 1 volume percent of the particles that have a diameter of less than about 30 µm; less than about 1 volume percent of the particles that have a diameter of less than about 30 µm; less than about 1 volume percent of the particles that have a diameter of less than about 40 µm; or less than about 0.5 volume percent of the particles that have a diameter of less than about 40 µm. In various embodiments, the crosslinked polymer has a particle size distribution wherein not more than about 5 volume % of the particles have a diameter less than about 30 µm (i.e., D(0.05)<30 µm), not more than about 5 volume % of the particles have a diameter greater than about 250 µm (i.e., D(0.05)>250 µm), and at least about 50 volume % of the particles have a diameter in the range from about 70 to about 150 µm.

The particle distribution of the crosslinked polymer can be described as the span. The span of the particle distribution is defined as (D(0.9)−D(0.1))/D(0.5), where D(0.9) is the value wherein 90% of the particles have a diameter below that value, D(0.1) is the value wherein 10% of the particles have a diameter below that value, and D(0.5) is the value wherein 50% of the particles have a diameter above that value and 50% of the particles have a diameter below that value as measured by laser diffraction. The span of the particle distribution is typically from about 0.5 to about 1, from about 0.5 to about 0.95, from about 0.5 to about 0.90, or from about 0.5 to about 0.85. Particle size distributions can be measured using Niro Method No. A 8 d (revised September 2005), available from GEA Niro, Denmark, using the Malvern Mastersizer.

Crosslinked polymers used in this invention also have desirable compressibility and bulk density when in the form of a dry powder. Some of the particles of the crosslinked polymers in the dry form have a bulk density of from about 0.8 g/cm$^3$ to about 1.5 g/cm$^3$, from about 0.82 g/cm$^3$ to about 1.5 g/cm$^3$, from about 0.84 g/cm$^3$ to about 1.5 g/cm$^3$, from about 0.86 g/cm$^3$ to about 1.5 g/cm$^3$, from about 0.8 g/cm$^3$ to about 1.2 g/cm$^3$, or from about 0.86 g/cm$^3$ to about 1.2 g/cm$^3$.

A powder composed of the particles of the crosslinked polymer in dry form has a compressibility index of from about 3 to about 15, from about 3 to about 14, from about 3 to about 13, from about 3 to about 12, from about 3 to about 11, from about 5 to about 15, from about 5 to about 13, or from about 5 to about 11. The compressibility index is defined as 100*(TD−BD)/TD, wherein BD and TD are the bulk density and tap density, respectively. Further, the powder form of the polymers settles into its smallest volume more easily than polymers conventionally used to treat hyperkalemia. This makes the difference between the bulk density and the tap density (measured powder density after tapping a set number of times) from about 3% to about 14%, from about 3% to about 13%, from about 3% to about 12%, from about 3% to about 11%, from about 3% to about 10%, from about 5% to about 14%, from about 5% to about 12%, or from about 5% to about 10% of the bulk density.

Generally the polymers in particle form are not absorbed from the gastrointestinal tract. The term "non-absorbed" and its grammatical equivalents is not intended to mean that the entire amount of administered polymer is not absorbed. It is expected that certain amounts of the polymer may be absorbed. Particularly, about 90% or more of the polymer is not absorbed, more particularly about 95% or more is not absorbed, even more particularly about 97% or more is not absorbed, and most particularly about 98% or more of the polymer is not absorbed.

The swelling ratio of the polymers in physiological isotonic buffer, which is representative of the gastrointestinal tract, is typically from about 1 to about 7, particularly from about 1 to about 5, more particularly from about 1 to about 3, and more specifically, from about 1 to about 2.5. In some embodiments, crosslinked polymers of the invention have a swelling ratio of less than 5, less than about 4, less than about 3, less than about 2.5, or less than about 2. As used herein, "swelling ratio" refers to the number of grams of solvent taken up by one gram of otherwise non-solvated crosslinked polymer when equilibrated in an aqueous environment. When more than one measurement of swelling is taken for a given polymer, the mean of the measurements is taken to be the swelling ratio. The polymer swelling can also be calculated by the percent weight gain of the otherwise non-solvated polymer upon taking up solvent. For example, a swelling ratio of 1 corresponds to polymer swelling of 100%.

Crosslinked polymers having advantageous surface morphology are polymers in the form of substantially spherical particles with a substantially smooth surface. A substantially smooth surface is a surface wherein the average distance from the peak to the valley of a surface feature determined at random over several different surface features and over several different particles is less than about 2 μm, less than about 1 μm, or less than about 0.5 μm. Typically, the average distance between the peak and the valley of a surface feature is less than about 1 μm.

The surface morphology can be measured using several techniques including those for measuring roughness. Roughness is a measure of the texture of a surface. It is quantified by the vertical deviations of a real surface from its ideal form. If these deviations are large, the surface is rough; if they are small the surface is smooth. Roughness is typically considered to be the high frequency, short wavelength component of a measured surface. For example, roughness may be measured using contact or non-contact methods. Contact methods involve dragging a measurement stylus across the surface; these instruments include profilometers and atomic force microscopes (AFM). Non-contact methods include interferometry, confocal microscopy, electrical capacitance and electron microscopy. These methods are described in more detail in Chapter 4: Surface Roughness and Microtopography by L. Mattson in Surface Characterization, ed. by D. Brune, R. Hellborg, H. J. Whitlow, O. Hunderi, Wiley-VCH, 1997.

For three-dimensional measurements, the probe is commanded to scan over a two-dimensional area on the surface. The spacing between data points may not be the same in both directions. Another way to measure the surface roughness is to crack the sample particles and obtain a SEM micrograph. In this way, a side view of the surface can be obtained and the relief of the surface can be measured.

The polymers may be tested for their characteristics and properties using a variety of established testing procedures. For example, the percent inorganic fluoride may be tested by mixing a dried sample of composition with C-Wax in a defined proportion, and making a pellet by pressing it with a force of about 40 kN in an aluminum cup. Percent fluorine content is analyzed by X-ray fluorescence in a manner known to those of skill in the art, for example, using a Bruker AXS SRS 3400 (Bruker, Wis. In general, the amount of inorganic fluorine in the composition is less than 25 wt. % and preferably less than 20 wt. %, based on the total weight of the composition.

Also for example, the potassium binding capacity can be used for polymer or composition characterization. In this example, the potassium binding capacity is performed in vitro by weighing and transferring approximately 300 mg of a dried sample of polymer into a 40 mL screw-top vial, and then adding a calculated volume of 200 mM KCl solution to achieve a concentration of 20 mg/mL of test substance. The vial is shaken vigorously for two hours, and the supernatant is filtered through a 0.45 μm filter followed by dilution to 1:20 in water. The supernatant is analyzed for potassium concentration via ICP-OES, and the potassium binding is calculated using the following formula.

$$\text{Potassium binding} = \frac{20 \text{ (dilution factor)}}{20 \text{ mg/mL (sample conc)}} \times ([K]_{blank} - [K]_{sample}) \frac{\text{mmol K}}{\text{g material}}$$

The term "treating" as used in connection with patients in need includes achieving a therapeutic benefit. By therapeutic benefit is meant eradication, amelioration, or prevention of the underlying disorder being treated. For example, in a hyperkalemia patient, therapeutic benefit includes eradication or amelioration of the underlying hyperkalemia. Also, a therapeutic benefit is achieved with the eradication, amelioration, or prevention of one or more of the physiological symptoms associated with the underlying disorder such that an improvement is observed in the patient, notwithstanding that the patient may still be afflicted with the underlying disorder. For example, administration of a potassium-binding polymer to a patient suffering from hyperkalemia provides therapeutic benefit not only when the patient's serum potassium level is decreased, but also when an improvement is observed in the patient with respect to other disorders that accompany hyperkalemia, like renal failure. In some treatment regimens, the crosslinked polymer or composition of the invention may be administered to a patient at risk of developing hyperkalemia or to a patient reporting one or more of the physiological symptoms of hyperkalemia, even though a diagnosis of hyperkalemia may not have been made.

Unless otherwise indicated, an alkyl group as described herein alone or as part of another group is an optionally substituted linear saturated monovalent hydrocarbon radical containing from one to twenty carbon atoms and preferably one to eight carbon atoms, or an optionally substituted branched saturated monovalent hydrocarbon radical containing three to twenty carbon atoms, and preferably three to eight carbon atoms. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The term "amide moiety" as used herein represents a bivalent (i.e., difunctional) group including at least one amido linkage

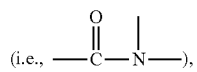

such as —C(O)—NR$_A$—R$_C$—NR$_B$—C(O)— wherein R$_A$ and R$_B$ are independently hydrogen or alkyl and R$_C$ is alkylene. For example, an amide moiety can be —C(O)—NH—(CH$_2$)$_p$—NH—C(O)— wherein p is an integer of 1 to 8.

The term "aryl" as used herein alone or as part of another group denotes an optionally substituted monovalent aromatic hydrocarbon radical, preferably a monovalent monocyclic or bicyclic group containing from 6 to 12 carbons in the ring portion, such as phenyl, biphenyl, naphthyl, substituted phenyl, substituted biphenyl or substituted naphthyl. Phenyl and substituted phenyl are the more preferred aryl groups. The term "aryl" also includes heteroaryl.

The terms "carboxylic acid group", "carboxylic" or "carboxyl" denote the monovalent radical —C(O)OH. Depending upon the pH conditions, the monovalent radical can be in the form —C(O)O$^-$X$^+$ wherein X$^+$ is a cation, or two of the monovalent radicals in close proximity can bond with a divalent cation X$^{2+}$, or a combination of these monovalent radicals and —C(O)OH are present.

The term "cycloalkyl" as used herein denotes optionally an optionally substituted cyclic saturated monovalent bridged or non-bridged hydrocarbon radical containing from three to eight carbon atoms in one ring and up to 20 carbon atoms in a multiple ring group. Exemplary unsubstituted cycloalkyl groups include cyclopropyl, cyclobutyl, cyclopentyl, cyclohexyl, cycloheptyl, cyclooctyl, adamantyl, norbornyl, and the like.

The term "-ene" as used as a suffix as part of another group denotes a bivalent radical in which a hydrogen atom is removed from each of two terminal carbons of the group, or if the group is cyclic, from each of two different carbon atoms in the ring. For example, alkylene denotes a bivalent alkyl group such as methylene (—CH$_2$—) or ethylene (—CH$_2$CH$_2$—), and arylene denotes a bivalent aryl group such as o-phenylene, m-phenylene, or p-phenylene.

The term "ether moiety" as used herein represents a bivalent (i.e., difunctional) group including at least one ether linkage (i.e., —O—). For example, in Formulae 3 or 33 as defined herein, the ether moiety can be —R$_A$OR$_B$— or —R$_A$OR$_C$OR$_B$— wherein R$_A$, R$_B$ and R$_C$ are independently alkylene.

The term "heteroaryl," as used herein alone or as part of another group, denotes an optionally substituted monovalent monocyclic or bicyclic aromatic radical of 5 to 10 ring atoms, where one or more, preferably one, two, or three, ring atoms are heteroatoms independently selected from N, O, and S, and the remaining ring atoms are carbon. Exemplary heteroaryl moieties include benzofuranyl, benzo[d]thiazolyl, isoquinolinyl, quinolinyl, thiophenyl, imidazolyl, oxazolyl, quinolinyl, furanyl, thiazolyl, pyridinyl, furyl, thienyl, pyridyl, oxazolyl, pyrrolyl, indolyl, quinolinyl, isoquinolinyl, and the like.

The term "heterocyclo," as used herein alone or as part of another group, denotes a saturated or unsaturated monovalent monocyclic group of 4 to 8 ring atoms, in which one or two ring atoms are heteroatom(s), independently selected from N, O, and S, and the remaining ring atoms are carbon atoms. Additionally, the heterocyclic ring may be fused to a phenyl or heteroaryl ring, provided that the entire heterocyclic ring is not completely aromatic. Exemplary heterocyclo groups include the heteroaryl groups described above, pyrrolidino, piperidino, morpholino, piperazino, and the like.

The term "hydrocarbon" as used herein describes a compound or radical consisting exclusively of the elements carbon and hydrogen.

The term "phosphonic" or "phosphonyl" denotes the monovalent radical

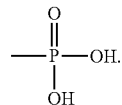

The term "phosphoric" or "phosphoryl" denotes the monovalent radical

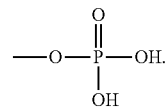

The term "protected" as used herein as part of another group denotes a group that blocks reaction at the protected portion of a compound while being easily removed under conditions that are sufficiently mild so as not to disturb other substituents of the compound. For example, a protected carboxylic acid group-C(O)OP$_g$ or a protected phosphoric acid group —OP(O)(OH)OP$_g$ or a protected phosphonic acid group —P(O)(OH)OP$_g$ each have a protecting group P$_g$ associated with the oxygen of the acid group wherein P$_g$ can be alkyl (e.g., methyl, ethyl, n-propyl, i-propyl, n-butyl, i-butyl, s-butyl, t-butyl, n-pentyl, i-pentyl, s-pentyl, t-pentyl, and the like), benzyl, silyl (e.g., trimethylsilyl (TMS), triethylsilyl (TES), triisopropylsilyl (TIPS), triphenylsilyl (TPS), t-butyldimethylsilyl (TBDMS), t-butyldiphenylsilyl (TBDPS) and the like. A variety of protecting groups and the synthesis thereof may be found in "Protective Groups in Organic Synthesis" by T. W. Greene and P. G. M. Wuts, John Wiley & Sons, 1999. When the term "protected" introduces a list of possible protected groups, it is intended that the term apply to every member of that group. That is, the phrase "protected carboxylic, phosphonic or phosphoric" is to be interpreted as "protected carboxylic, protected phosphonic or protected phosphoric." Likewise, the phrase "optionally protected carboxylic, phosphoric or phosphonic" is to be interpreted as "optionally protected carboxylic, optionally protected phosphonic or optionally protected phosphoric."

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON(R$_A$)(R$_B$), wherein R$_A$ and $R_B$ are independently hydrogen, alkyl, or aryl), amino(—$N(R_A)(R_B)$, wherein $R_A$ and $R_B$ are independently hydrogen, alkyl or aryl), halo (fluoro, chloro, bromo, or iodo), silyl, nitro (—$NO_2$), an ether (—$OR_A$ wherein $R_A$ is aryl or alkyl), an ester (—$OC(O)R_A$ wherein $R_A$ is aryl or alkyl), keto (—$C(O)R_A$ wherein $R_A$ is aryl or alkyl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

Having described the invention in detail, it will be apparent that modifications and variations are possible without departing from the scope of the invention defined in the appended claims. As various changes could be made in the above methods without departing from the scope of the invention, it is intended that all matter contained in the above description shall be interpreted as illustrative and not in a limiting sense.

What is claimed is:

1. A continuous process for preparing a crosslinked polymer comprising reacting a polymerization mixture comprising monomers of either (i) Formulae 11 and 22, (ii) Formulae 11 and 33, or (iii) Formulae 11, 22, and 33, wherein Formula 11, Formula 22, and Formula 33 are represented by the following structures:

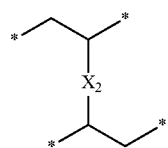

Formula 11

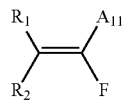

Formula 22

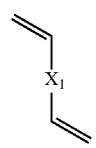

Formula 33

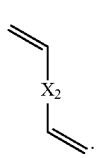

in a continuous process to form a crosslinked polymer comprising structural units corresponding to Formulae 1 and 2, Formulae 1 and 3, or Formulae 1, 2, and 3, wherein Formula 1, Formula 2, and Formula 3 are represented by the following structures:

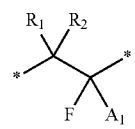

Formula 1

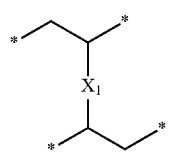

Formula 2

Formula 3

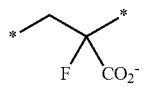

wherein $R_1$ and $R_2$ are each independently hydrogen, alkyl, cycloalkyl, or aryl;

$A_1$ is carboxylic, phosphonic, or phosphoric;

$A_{11}$ is an optionally protected carboxylic, phosphonic, or phosphoric;

$X_1$ is arylene; and $X_2$ is alkylene, an ether moiety, or an amide moiety;

wherein the crosslinked polymer is in the form of a particle and not more than about 5 volume % of the particles have a diameter less than about 30 μm (D(0.05)<30 μm), not more than about 5 volume % of the particles have a diameter greater than about 250 μm (D(0.05)>250 μm), and at least about 50 volume % of the particles have a diameter in the range from about 70 to about 150 μm.

2. The process of claim 1 wherein the structural units represented by Formulae 1, 2, and 3 are represented by the following structures:

Formula 1A

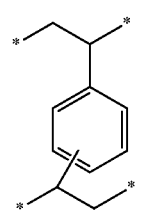

Formula 2A

Formula 3A

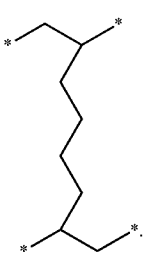

and the monomers of Formulae 11, 22, and 33 are represented by the following structures:

Formula 11A

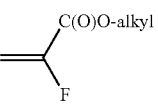

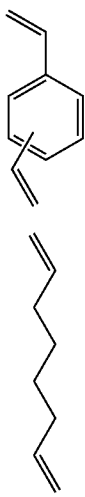

Formula 22A

Formula 33A wherein alkyl is methyl, ethyl, propyl, iso-propyl, butyl, iso-butyl, sec-butyl, tert-butyl, pentyl, iso-pentyl, sec-pentyl, or tert-pentyl.

3. The process of claim 1 wherein the polymer comprises structural units corresponding to Formulae 1, 2 and 3.

4. The process of claim 3 wherein either:
(i) the structural units corresponding to Formula 1 constitute at least about 85 wt. % based on the total weight of structural units of Formulae 1, 2, and 3 in the polymer calculated from the amounts of monomers used in the polymerization reaction, and the weight ratio of the structural unit corresponding to Formula 2 to the structural unit corresponding to Formula 3 is from about 4:1 to about 1:4, or
(ii) the mole fraction of the structural unit of Formula 1 in the polymer is at least about 0.87 based on the total number of moles of the structural units of Formulae 1, 2, and 3 calculated from the amounts of monomers used in the polymerization reaction, and the mole ratio of the structural unit of Formula 2 to the structural unit of Formula 3 is from about 0.2:1 to about 7:1.

5. The process of claim 1 wherein the polymer comprises structural units corresponding to Formulae 1 and 2.

6. The process of claim 1 wherein the polymer comprises structural units corresponding to Formulae 1 and 3.

7. The process of claim 1 wherein the polymerization mixture further comprises a polymerization initiator.

8. The process of claim 1, further comprising reacting the polymerization mixture in a continuous reactor, with an aqueous phase and an organic phase fed to the reactor.

9. The process of claim 8, wherein the organic phase comprises a mixture of monomers that are mixed in a mixer prior to being fed to the reactor.

10. The process of claim 8, wherein the aqueous phase comprises a mixture of water, surfactant and salts are mixed prior to being fed to the reactor.

11. The process of claim 8, wherein the reactor is a plug flow reactor.

12. The process of claim 11, wherein the plug flow reactor additionally comprises an orifice plate.

13. The process of claim 12, wherein the orifice plate has one or more orifices sized and shaped to produce a polymer particle that is substantially spherical.

14. The process of claim 8, wherein an exit stream from the continuous reactor is received by a continuous stirred tank reactor.

15. The process of claim 1 wherein the polymer is a crosslinked (2-fluoroacrylate)-divinylbenzene-1,7-octadiene polymer.

16. The process of claim 15 wherein the crosslinked polymer is in the form of a particle having a particle distribution span of from about 0.5 to about 1.

17. The process of claim 15 wherein the crosslinked polymer is in the form of a particle having a particle distribution span of from about 0.5 to about 0.9.

* * * * *